United States Patent
Park et al.

(10) Patent No.: US 8,387,189 B2
(45) Date of Patent: Mar. 5, 2013

(54) METHOD FOR WASHING OF WASHER

(75) Inventors: Seog Kyu Park, Changwon-si (KR); Phal Jin Lee, Jinhae-si (KR); Youn Dong Lee, Changwon-si (KR); In Geun Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 585 days.

(21) Appl. No.: 11/628,946

(22) PCT Filed: Mar. 23, 2006

(86) PCT No.: PCT/KR2006/001076
§ 371 (c)(1),
(2), (4) Date: Nov. 17, 2008

(87) PCT Pub. No.: WO2006/101362
PCT Pub. Date: Sep. 28, 2006

(65) Prior Publication Data
US 2009/0077755 A1  Mar. 26, 2009

(30) Foreign Application Priority Data

| Mar. 25, 2005 | (KR) | 10-2005-0025058 |
| Mar. 25, 2005 | (KR) | 10-2005-0025103 |
| Mar. 25, 2005 | (KR) | 10-2005-0025105 |
| Jun. 30, 2005 | (KR) | 10-2005-0057973 |

(51) Int. Cl.
*D06F 35/00* (2006.01)
(52) U.S. Cl. .............................. 8/158; 8/159
(58) Field of Classification Search .............. 8/158
See application file for complete search history.

(56) References Cited

U.S. PATENT DOCUMENTS

| 4,551,263 | A | * | 11/1985 | Schellhammer et al. | 252/186.39 |
| 4,784,666 | A |   | 11/1988 | Brenner et al. | |
| 5,315,727 | A | * | 5/1994 | Lee | 8/159 |
| 2002/0133886 | A1 |   | 9/2002 | Severns et al. | |
| 2003/0208852 | A1 |   | 11/2003 | Hardaway et al. | |
| 2004/0089029 | A1 | * | 5/2004 | Sakita et al. | 68/12.12 |
| 2004/0163183 | A1 | * | 8/2004 | Kim | 8/137 |
| 2004/0187529 | A1 | * | 9/2004 | Kim et al. | 68/207 |
| 2004/0255391 | A1 | * | 12/2004 | Kim et al. | 8/149.3 |
| 2005/0000033 | A1 | * | 1/2005 | Park et al. | 8/159 |
| 2005/0015892 | A1 | * | 1/2005 | Park et al. | 8/159 |

FOREIGN PATENT DOCUMENTS

| CN | 1534128 A | 10/2004 |
| CN | 1537995 | 10/2004 |
| EP | 1507032 A | 2/2005 |
| JP | 07-024177 | 1/1995 |
| JP | 7-222891 A | 8/1995 |
| JP | 7-308484 A | 11/1995 |
| JP | 09-285681 | 11/1997 |
| JP | U3075120 | 11/2000 |
| KR | 10-2005-0015691 A | 2/2005 |

* cited by examiner

*Primary Examiner* — Michael Barr
*Assistant Examiner* — Jason Ko
(74) *Attorney, Agent, or Firm* — McKenna Long & Aldridge LLP

(57) ABSTRACT

A novel washing method of a washing machine that is capable of performing a washing operation of laundry with reduced washing water consumption and low power consumption and, in addition, sterilizing the laundry is disclosed. The washing method includes supplying washing water containing detergent into a tub to perform a high-concentration washing process, and, before or after the high-concentration washing process, supplying steam into a drum.

18 Claims, 12 Drawing Sheets

METHOD FOR WASHING OF WASHER

This application claims priority to International application No. PCT/KR2006/001076 filed on Mar. 23, 2006, Korean Application No. 10-2005-0025103 filed on Mar. 25, 2005, Korean Application No. 10-2005-0025105 filed on Mar. 25, 2005, Korean Application No. 10-2005-0025058 filed on Mar. 25, 2005, Korean Application No. 10-2005-0057973 filed on Jun. 30, 2005, all of which are incorporated by reference, as if fully set forth herein.

TECHNICAL FIELD

The present invention relates to a washing machine, and more particularly, to a novel washing method of a washing machine that is capable of performing a washing operation of laundry with reduced washing water consumption and low power consumption and, in addition, sterilizing the laundry.

BACKGROUND ART

Generally, mashing machines are classified into a pulsator type washing machine, a drum of which is mounted in a vertical direction, and a drum type washing machine, the drum of which is mounted in a horizontal direction.

In the drum type washing machine, as the drum is mounted in the horizontal direction as described above, laundry received in the drum is washed by a lifting and dropping operation.

FIGS. 1 and 2 schematically illustrate the structure of a conventional drum type washing machine.

As shown in the drawings, the drum type washing machine includes a machine case 10, a tub 20 mounted in the machine case 10, a drum rotatably mounted in the tub 20, and a driving unit for driving the drum 30.

At the front part of the machine case 10 is formed a laundry inlet hole 11, through which laundry is put into the drum. A door 40 is mounted to the machine case adjacent to the laundry inlet hole 11 for opening and closing the laundry inlet hole 11.

At the inner circumference of the laundry inlet hole 11 is mounted a rim part 50, which accomplishes sealing between the door 40 and the laundry inlet hole 11.

At the bottoms of opposite sides of the outer circumference of the tub 20 are mounted dampers 21, which support the tub 20 in the machine case 10.

A washing water heater 60 for heating washing water is mounted in the lower part of the tub 20.

The driving unit includes a driving motor 71 for driving the drum 30, a belt 72 for transmitting the driving force of the driving motor to the drum 30.

DISCLOSURE OF INVENTION

Technical Problem

In the conventional washing machine with the above-stated construction, however, even when the washing process is carried out to wash a small amount of laundry and even when the washing process is carried out to wash laundry having low contamination, a large amount of washing water is unnecessarily consumed. Also, the above-described washing process is carried out for the same period of time as a normal washing process, and therefore, the power consumption is also unnecessarily large.

Especially, it is more efficient to carry out a wetting process before the washing process is carried out since the washing performance is increased by the wetting process. However, the amount of the washing water consumed when the wetting process is carried out is very large. For this reason, the wetting process is omitted when the normal washing process is carried out, and therefore, the best washing performance is not accomplished.

Also, the conventional washing operation does not include a laundry sterilizing process.

Of course, although not shown in the drawings, there has been proposed, in recent years, a washing machine including an additional heater for heating washing water such that laundry can be boiled. In this case, however, the sterilization of the laundry is accomplished only by the boiling operation. As a result, an amount of washing water and power consumed to boil the laundry is greatly increased.

Furthermore, accuracy of the water level detection for the supply of the washing water is low, and therefore, the water is unnecessarily supplied again, whereby waste of the water is increased.

Consequently, a novel washing method that is capable of performing a sterilizing operation of laundry with reduced washing water consumption and low power consumption is required.

Technical Solution

Therefore, the present invention has been made in view of the above problems, and it is an object of the present invention to provide a novel washing method of a washing machine that is capable of performing a washing operation of laundry with reduced washing water consumption and low power consumption and, in addition, sterilizing the laundry.

Additional advantages, objects, and features of the present invention will be set forth in part in the following description of preferred embodiments.

The object of the present invention can be achieved by providing a washing method of a washing machine comprising the steps of: supplying washing water containing detergent into a tub to perform a high-concentration washing process; and before or after the high-concentration washing process, supplying steam into a drum.

Preferably, the washing method further comprises: while the washing process is carried out, wetting the laundry and circulating the washing water supplied into the tub to the drum, which are carried out simultaneously.

More preferably, the washing method further comprises: while the washing process is carried out, wetting the laundry, circulating the washing water supplied into the tub to the drum, and supplying steam into the drum, which are carried out simultaneously.

The present invention is characterized in that steam is supplied into the drum at the same time when the high-concentration washing step is carried out.

The present invention is characterized in that the washing method further comprises: after the high-concentration washing step is carried out, further supplying water to perform the washing process again using the diluted washing water.

Preferably, the washing method further comprises: while the washing process is carried out, wetting the laundry, wherein the drum is driven, while the laundry is wetted, such that the laundry in the drum can be smoothly wetted.

The present invention is characterized in that the high-concentration washing process is controlled such that the high-concentration washing process is carried out when the interior temperature of the drum exceeds a predetermined temperature level.

The present invention is characterized in that, at the high-concentration washing step, the water level of the supplied washing water is lower than a predetermined water level of washing water previously set depending upon the amount of laundry, but is higher than the bottom surface of the drum.

The present invention is characterized in that the step of supplying the steam into the drum is continuously carried out for a predetermined period of time until the interior temperature of the drum reaches a predetermined temperature range.

The present invention is characterized in that the predetermined temperature range is a temperature range at which sterilization is possible, and the predetermined period of time is a period of time in which sterilization is possible.

The present invention is characterized in that water level detection, which is necessary for determining whether further supply of washing water into the tub is needed while the steps are carried out, is carried out at off sections of a motor for driving the drum and a circulating pump for circulating the washing water.

The present invention is characterized in that, when it is determined, based on the result of the water level detection, that the further supply of water is needed, water is supplied again up to a predetermined water level, the predetermined water level being differently set depending upon the amount of the laundry, or being set to the minimum level at which the washing is possible irrespective of the laundry amount.

The present invention is characterized in that, when the motor is driven to rotate the drum, and the circulating pump is driven to circulate the washing water, a control operation is carried out such that the on timing of the drum motor coincides with the on timing of the circulating pump.

The present invention is characterized in that a control operation is carried out such that the off timing of the drum motor coincides with the off timing of the circulating pump.

The present invention is characterized in that, at the step of supplying the steam into the drum, the motor for driving the drum and the circulating pump for circulating the washing water are driven while the real operation rate of the motor coincides with that of the circulating pump.

The present invention is characterized in that, at the high-concentration washing step, a control operation is carried out such that the real operation rate of the motor does not coincide with that of the circulating pump.

Advantageous Effects

The washing method of the washing machine according to the present invention has the effect of performing the washing operation with reduced washing water consumption and low power consumption.

Especially, according to the present invention, the sterilization of the laundry is accomplished using the high-temperature steam. Consequently, the washing method according to the present invention has the effect of improving the washing performance and obtaining the sterilization effects.

Also, according to the present invention, the washing process is performed first using the highly-concentrated detergent, and then the dilution washing process is carried out. Consequently, the washing method according to the present invention has the effect of greatly improving the washing performance.

Especially, the amount of water further supplied is accurately controlled by detecting the water level in the tub at the sections where the change of the water level is stabilized, i.e., at the off sections of the circulating pump and the drum motor. Consequently, the washing method according to the present invention has the effect of minimizing the amount of the washing water used and optimizing the washing performance.

Furthermore, the washing effect is greatly increased by appropriately driving the circulating pump together with the drum motor during the washing operation according to the present invention. Consequently, the washing method according to the present invention has the effect of greatly improving the satisfaction of consumers with respect to the washing performance.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
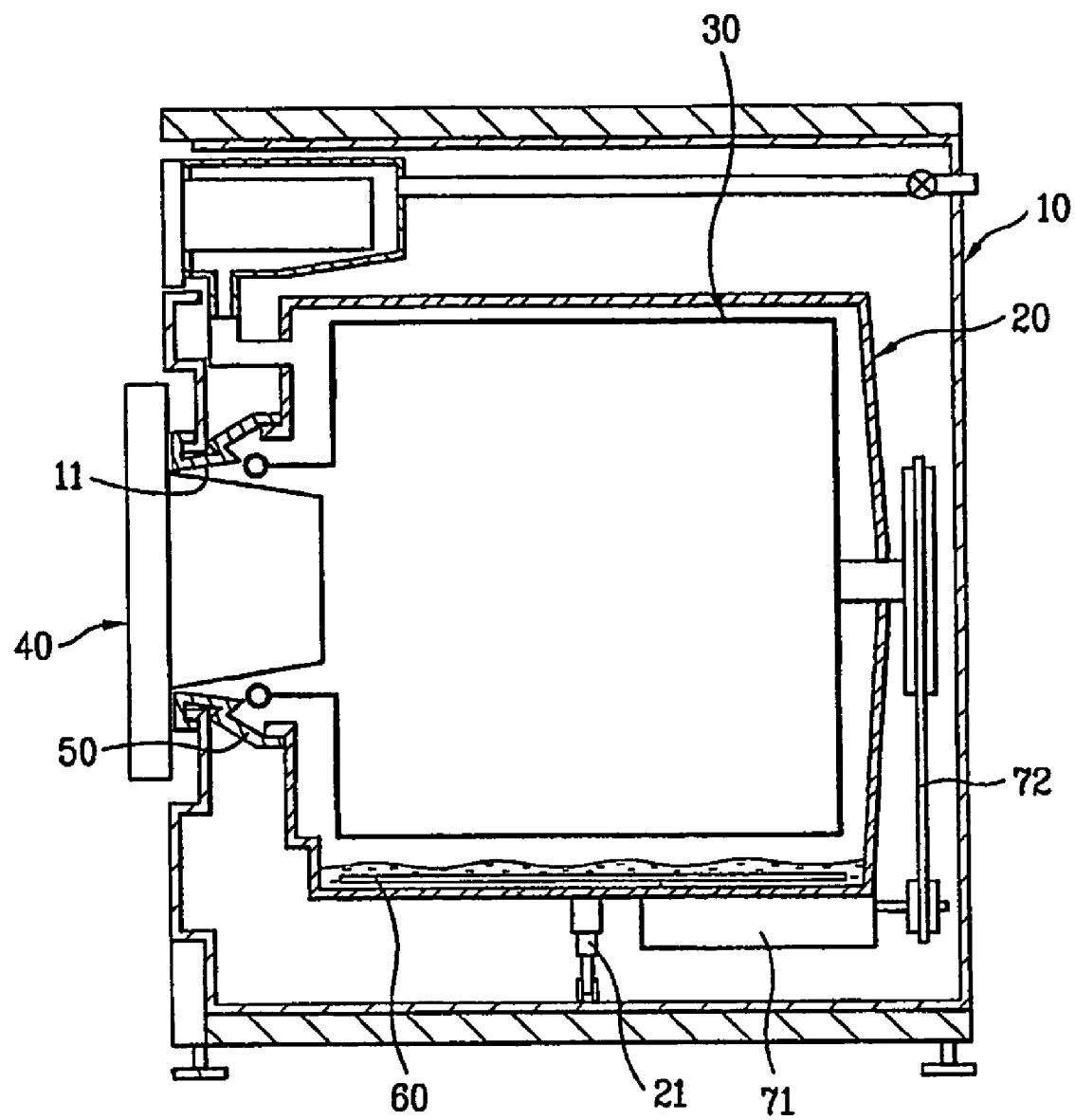
FIG. 1 is a side view, in section, illustrating the interior structure of a conventional drum type washing machine.
Figure 2:
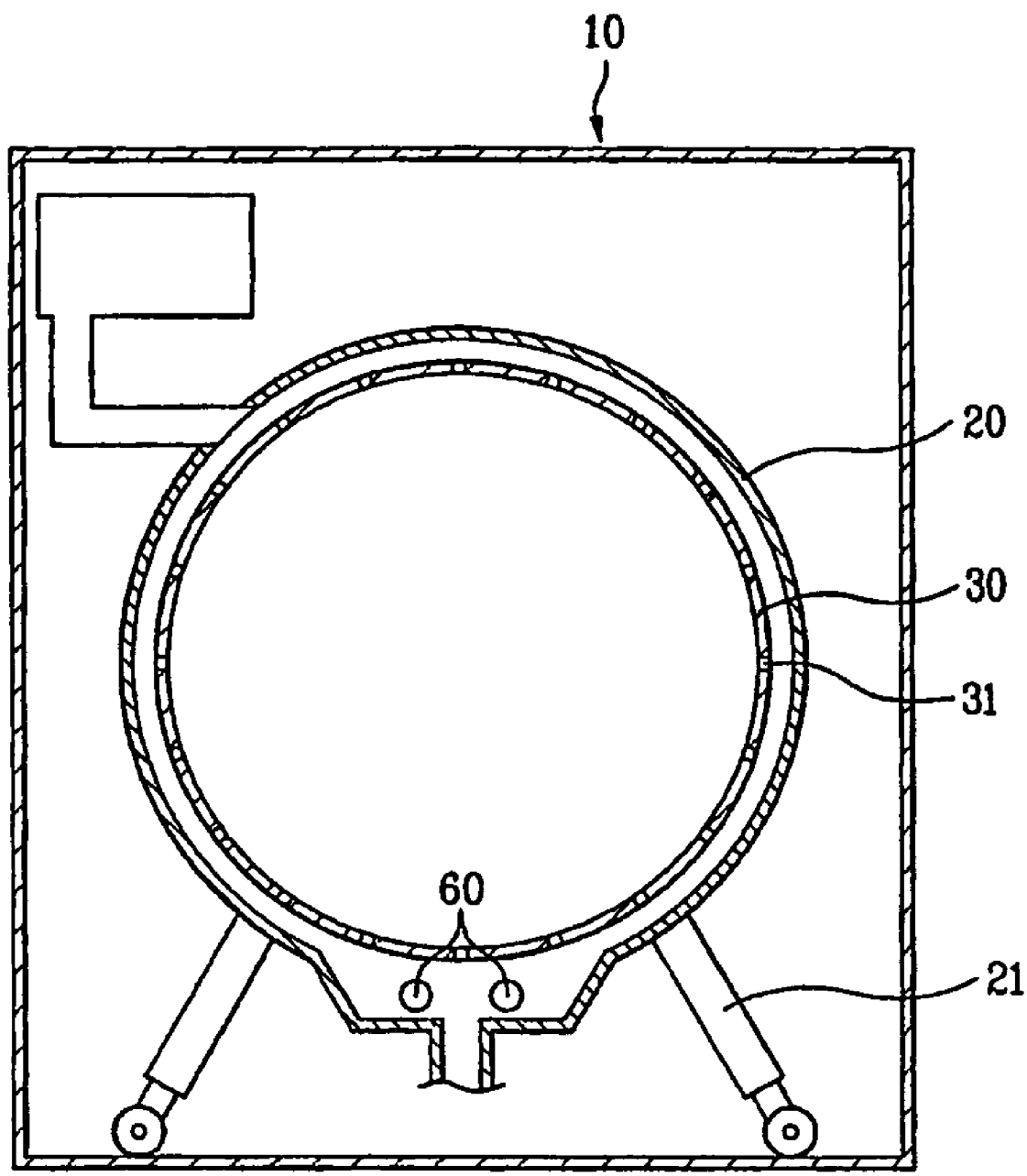
FIG. 2 is a front view, in section, illustrating the interior structure of the conventional drum type washing machine.
Figure 3:
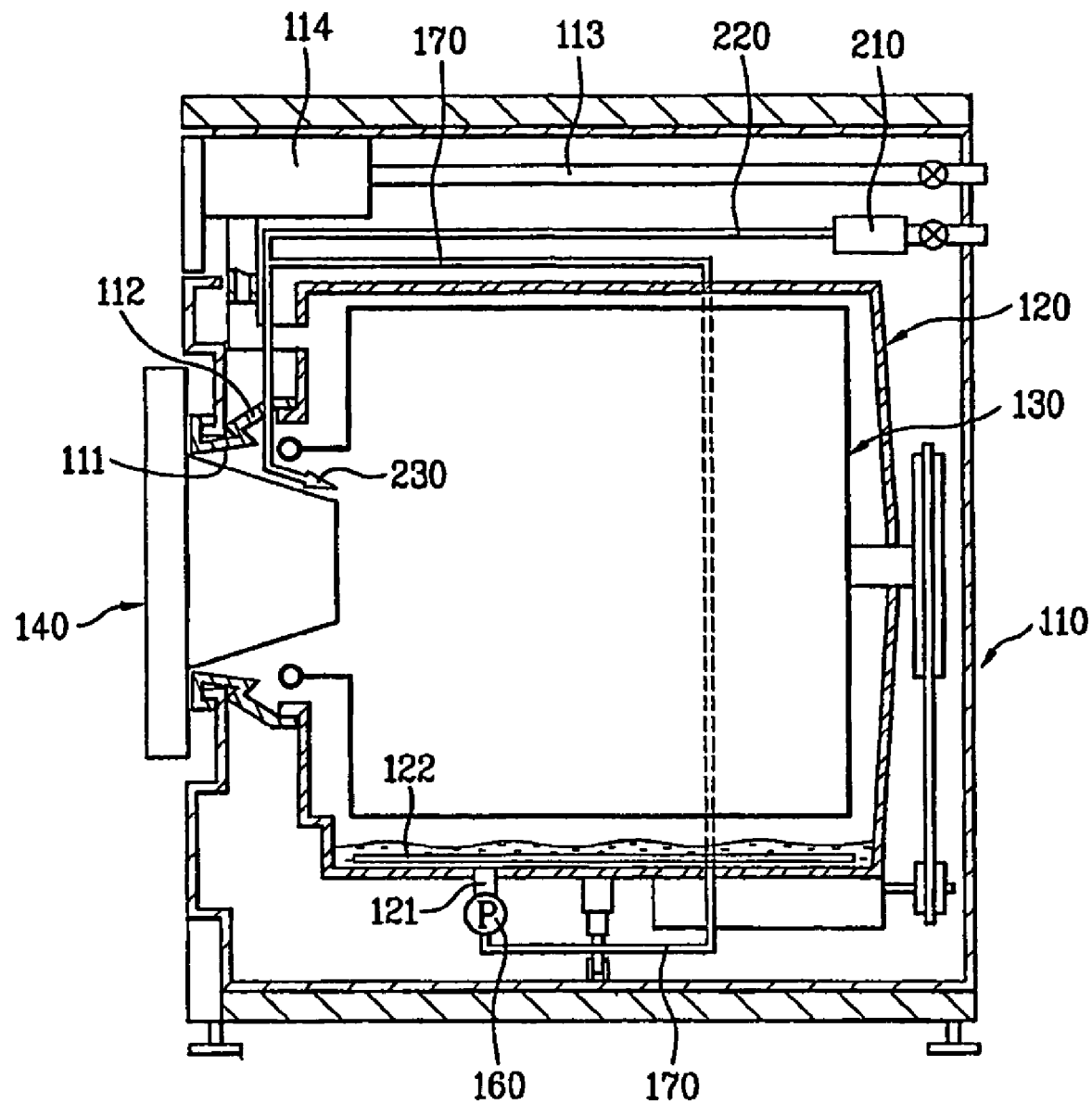
FIG. 3 is a side view, in section, illustrating the interior structure of a washing machine according to a preferred embodiment of the present invention.
Figure 4:
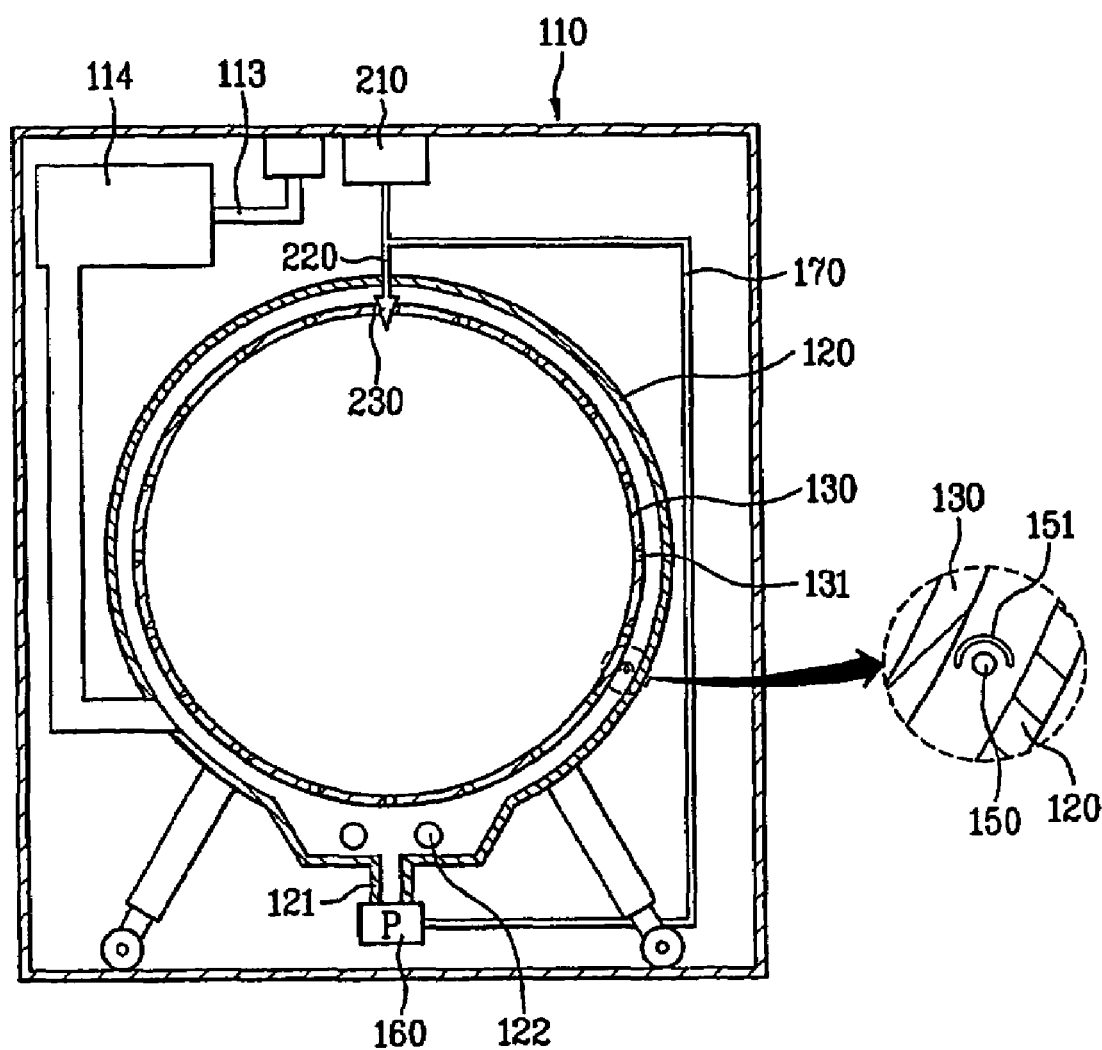
FIG. 4 is a front view, in section; illustrating the interior structure of the washing machine according to the preferred embodiment of the present invention.

FIG. 3 is a side view, in section, illustrating the interior structure of a washing machine according to a preferred embodiment of the present invention, and FIG. 4 is a front view, in section, illustrating the interior structure of the washing machine according to the preferred embodiment of the present invention.

The washing machine according to the preferred embodiment of the present invention includes a machine case 110, a tub 120, a drum 130, a steam supply unit, a temperature sensor 150, a circulating pump 160, and a circulation channel 170. In this embodiment, the washing machine is a drum type washing machine.

The machine case 110 constitutes the external appearance of the drum type washing machine. At the front part of the machine case 110 is formed a laundry inlet hole 111.

A door 140 is mounted to the machine case 110 adjacent to the laundry inlet hole 111 for opening and closing the laundry inlet hole 111. At the inner circumference of the laundry inlet hole 111 is mounted a rim part 112, which accomplishes sealing between the door 140 and the laundry inlet hole 111.

Also, a washing water supply pipe 113, which supplies washing water into the tub 120, is mounted in the machine case 110. On the pipe line of the washing water supply pipe 113 is mounted a detergent box 114.

The tub 120 is mounted in the machine case 110 in a suspended state.

To the lower part of the tub 120 is connected a water drainage channel 121, through which washing water is drained.

Also, a washing water heater 122, which heats washing water supplied into the tub 120, is mounted in the lower part of the tub 120.

The drum 130 is rotatably mounted in the tub 120, and is disposed such that the open side of the drum 130 is directed to the laundry inlet hole 111 of the machine case 110.

At the circumference of the drum are formed a plurality of through-holes 131, through which washing water and steam supplied into the tub 120 are introduced into the drum 130.

The steam supply unit is constructed to supply a predetermined amount of steam into the tub 120 and/or the drum 130. In this embodiment, at least one steam supply unit is provided.

The steam supply unit serves to evaporate water using high-temperature hot air and to supply steam into the tub 120 and/or the drum 130. The steam supply unit includes a heating part 210 for generating high-temperature hot air to evaporate water, and a steam supply pipe 220, through which steam generated from the water evaporation by the heating part 210 flows.

Also, the steam supply unit further includes an injection nozzle 230 for injecting the steam flowing through the steam supply pipe 220 into the tub 120 and/or the drum 130.

The injection nozzle 230 is constructed in the shape of a nozzle such that steam can be smoothly ejected through the nozzle. Preferably, the end of the injection nozzle 230, through which the steam is discharged, extends through the rim part 112 such that the end of the injection nozzle 230 is directed to the interior of the drum 130.

The temperature sensor 150 is mounted at a predetermined position in the tub 120 for detecting the interior temperature of the tub 120.

At this time, the temperature detected by the temperature sensor 150 is used to control the operation of the steam supply unit.

Especially, it is preferable to construct the temperature sensor 150 such that the temperature sensor 150 is not directly affected by the steam supplied into the tub 120 by the steam supply unit, and therefore, the temperature can be accurately detected by the temperature sensor 150.

Accordingly, it is preferable that a separate cover 151 be disposed around the temperature sensor 150, specifically, at the side of the temperature sensor 150, which is opposite to the injecting direction of the steam, and at the upper circumference of the temperature sensor 150.

Although the temperature sensor 150 is positioned approximately at the center level of the tub 120 as shown in the drawings, the temperature sensor 150 may be positioned at the lower part of the tub 120, i.e., at the region where the washing water heater 122 is mounted.

The circulating pump 160 is mounted on the water drainage channel 121, which is connected to the tub 120. The circulating pump 160 is operated to pump the washing water supplied into the tub and to circulate the pumped washing water.

The circulation channel 170 is connected to the circulating pump 160 for guiding circulation of the washing water pumped by the circulating pump 160.

The end of the circulation channel 170, i.e., the washing water discharge side of the circulation channel 170, extends through the rim part 112 such that the end of the circulation channel 170 is directed to the inner wall surface of the drum 130.

Especially, it is more preferable in this embodiment that the end of the circulation channel 170 be connected to the steam supply pipe 220 as shown in the drawings.

Hereinafter, washing methods according to preferred embodiments of the present invention will be described in detail.

Figure 5:
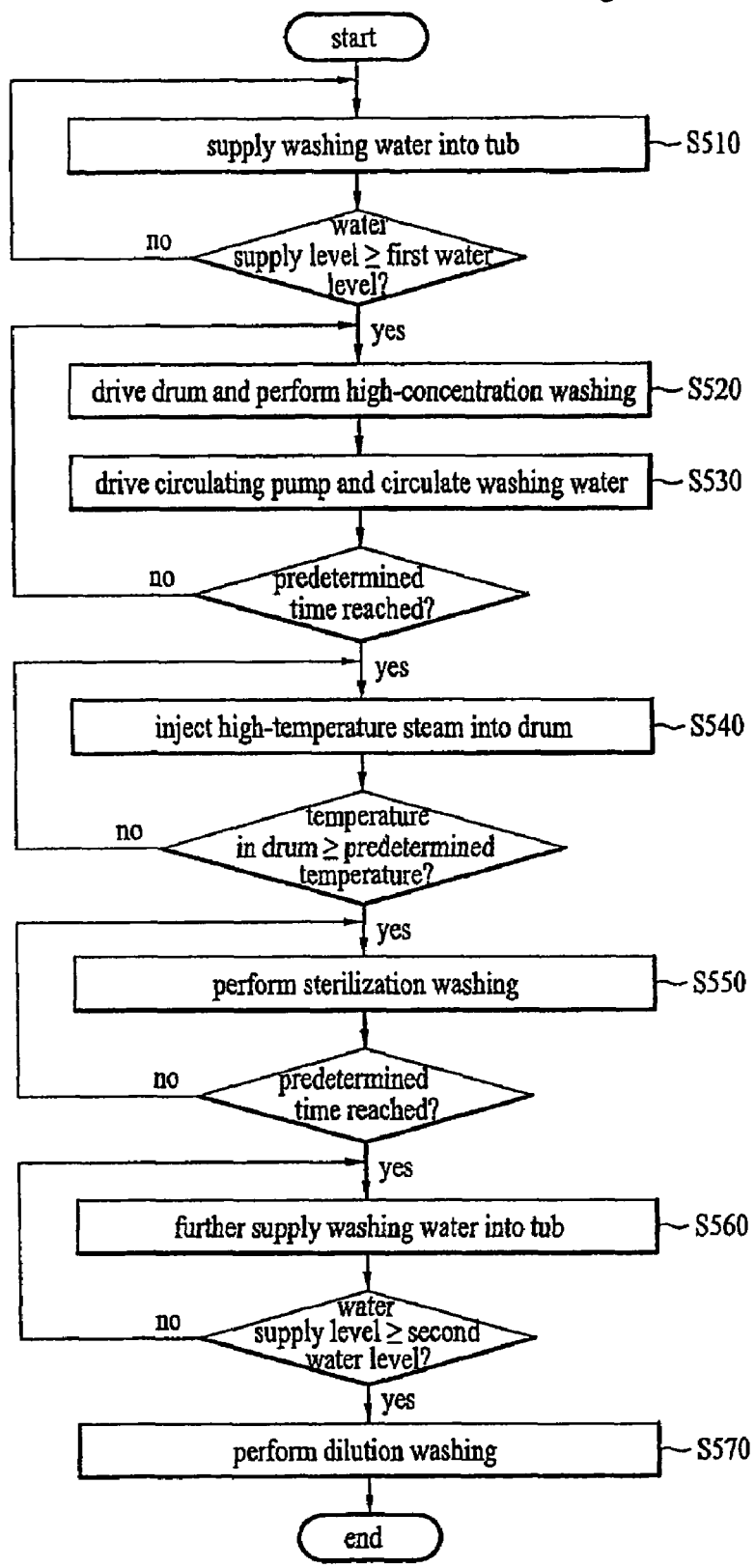
FIG. 5 is a flow chart illustrating a washing method of a washing machine according to a preferred embodiment of the present invention.
Figure 6:
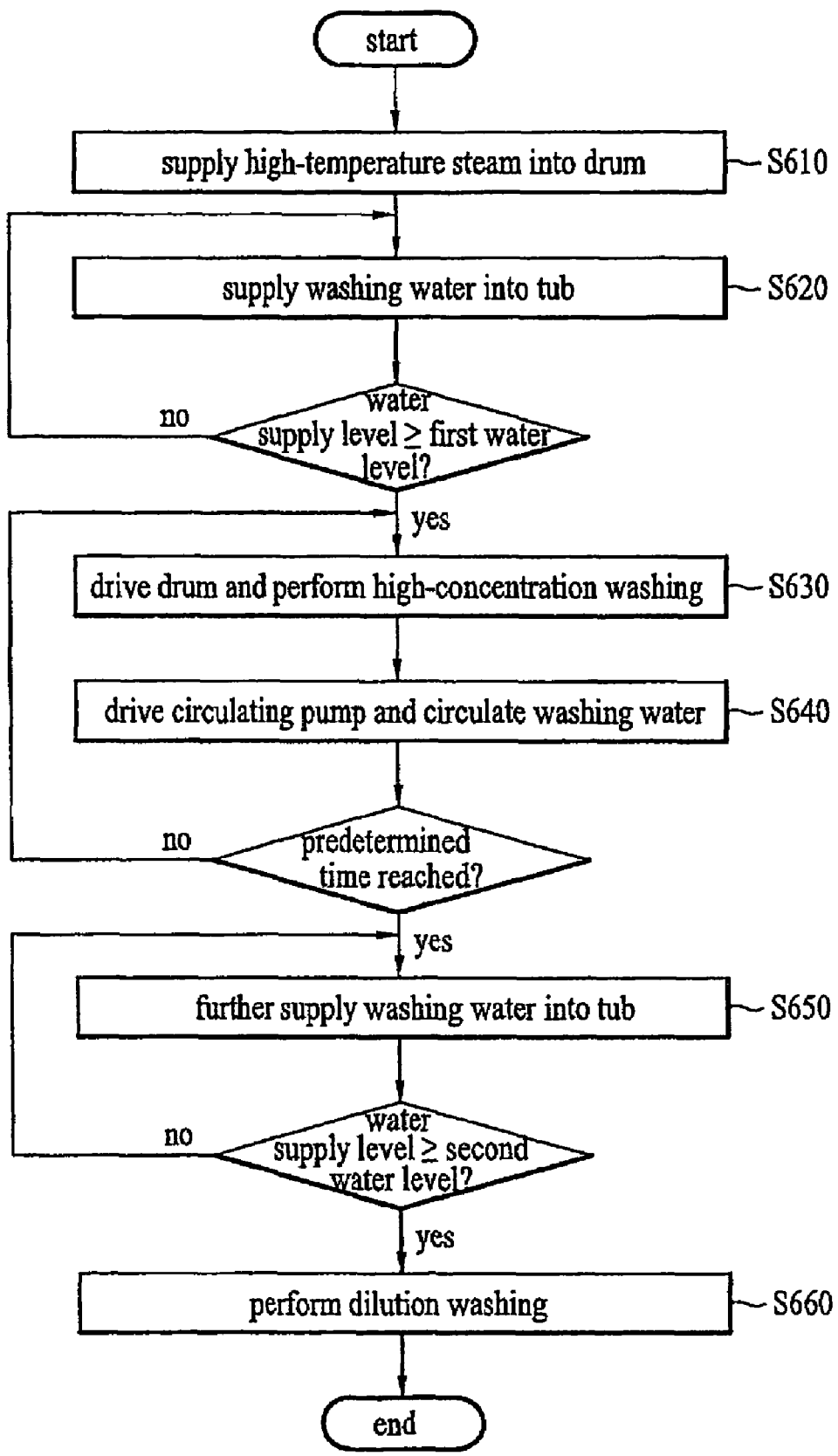
FIG. 6 is a flow chart illustrating a washing method of a washing machine according to another preferred embodiment of the present invention.

FIG. 5 is a flow chart illustrating a washing method of the washing machine according to a preferred embodiment of the present invention, and FIG. 6 is a flaw chart illustrating a washing method of the washing machine according to another preferred embodiment of the present invention.

Figure 7:
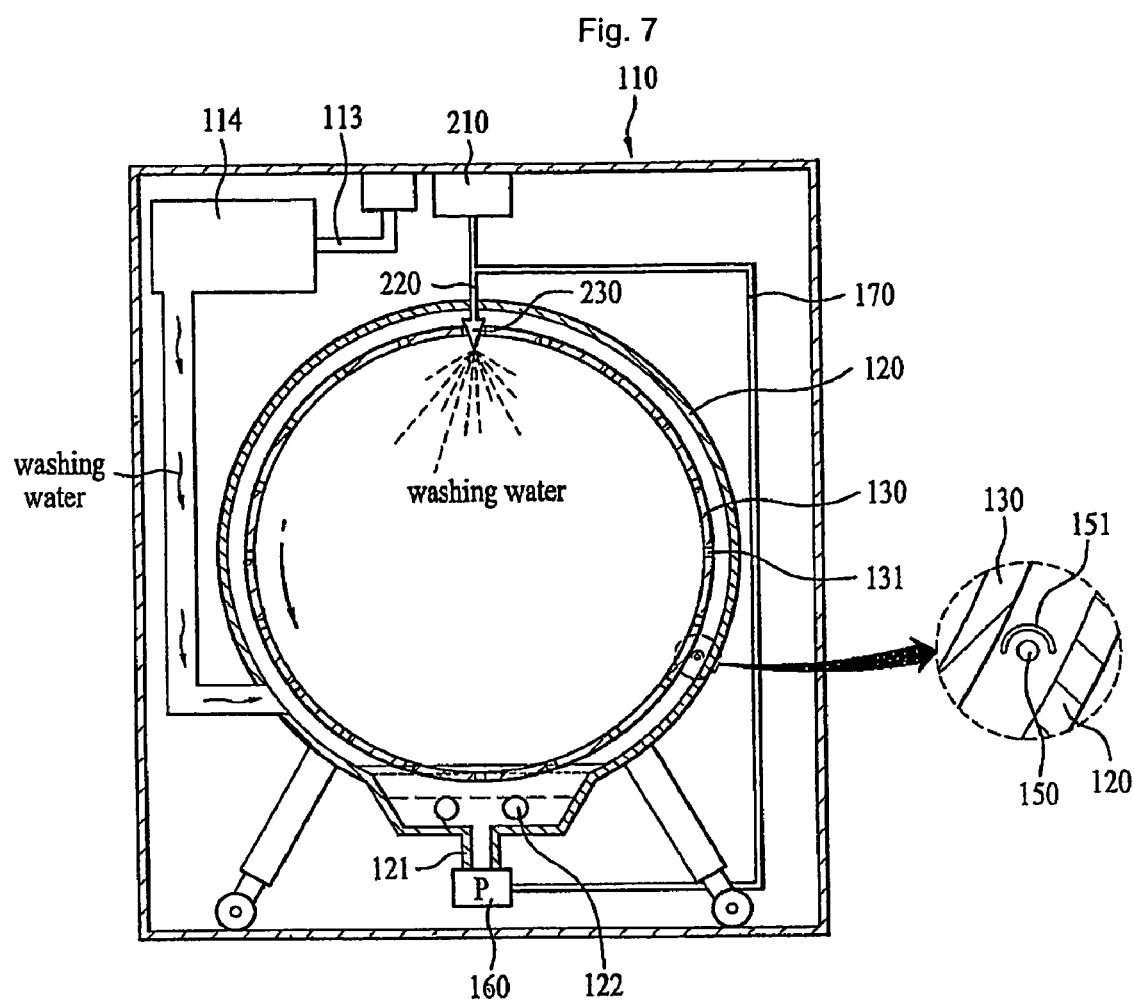
FIGS. 7 to 9 are views illustrating the washing method of the washing machine according to the present invention.
Figure 8:
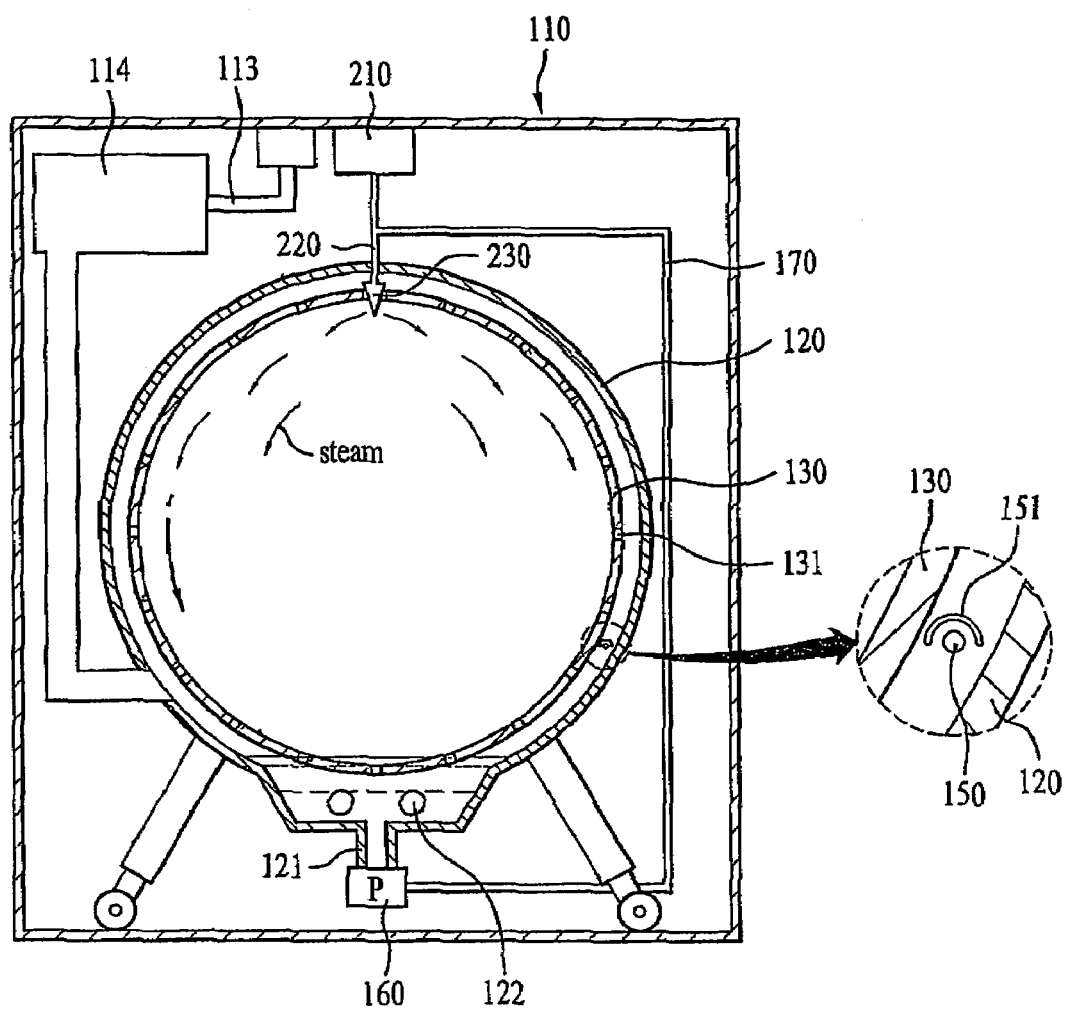
Figure 9:
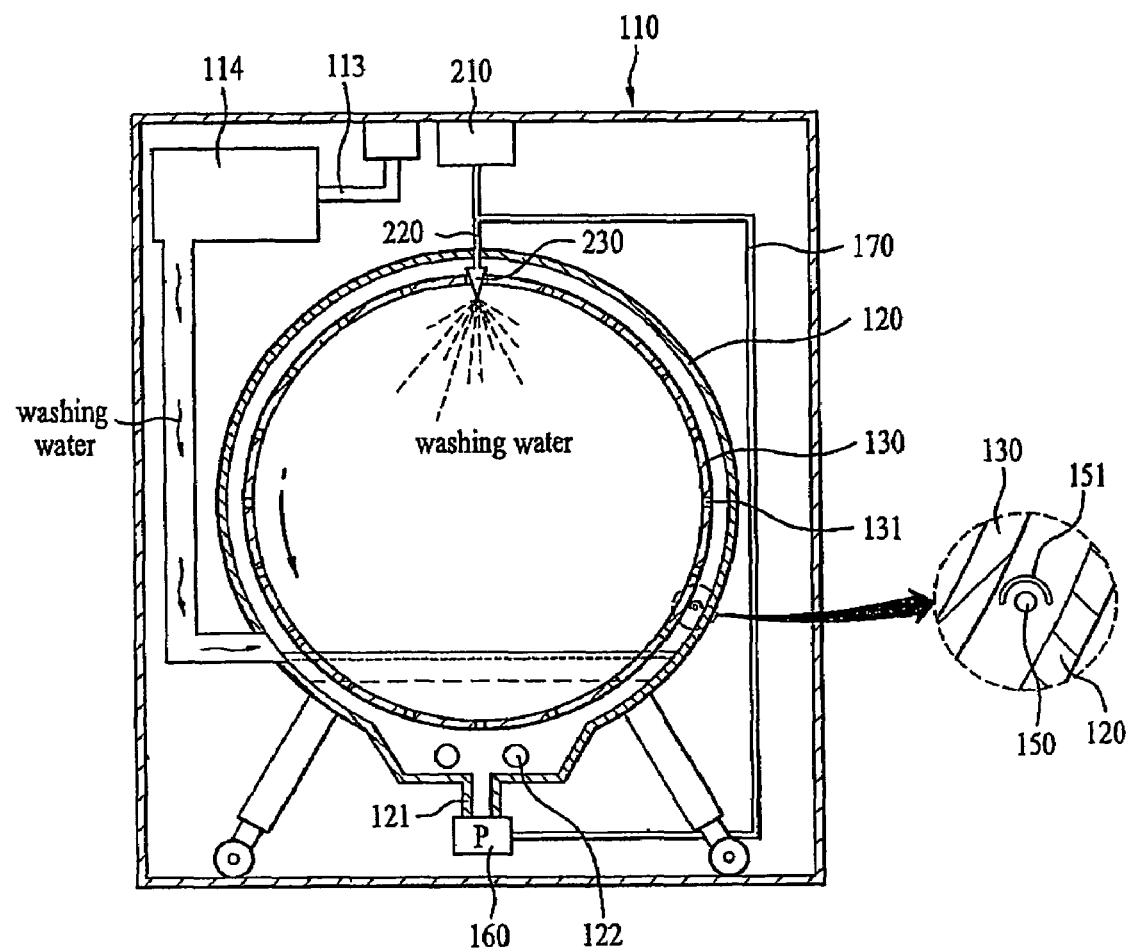

FIGS. 7 to 9 are views illustrating the washing method of the washing machine according to the present invention.

First, when a washing process is requested by a user, a controller (not shown), which constitutes the washing machine, supplies washing water into the tub 120 (S510).

At this time, the washing water passes through the detergent box 114, which is mounted on the pipe line of the washing water supply pipe 113, in the course of the washing water being supplied through the washing water supply pipe 113.

Since a predetermined amount of detergent is received in the detergent box 114, the washing water supplied into the tub 120 contains the detergent stored in the detergent box 114.

Especially, in the above-described washing water supply process, the washing water is controlled such that the washing water is in a highly concentrated state.

This is accomplished by maintaining the water level of the supplied washing water such that the water level of the supplied washing water is lower than a predetermined water level of washing water previously set depending upon the amount of laundry but is higher than the bottom surface of the drum 130, and, especially, the water level of the supplied washing water is a level at which the washing water heater 122 is approximately submerged in the washing water, as shown in FIG. 7.

At this time, it is most preferable that the water level of the supplied washing water is a level at which the bottom surface of the drum 130 is approximately submerged in the washing water, i.e., a level at which the laundry in the drum 130 is wetted ("first water level").

After the above-described water supply process is completed, the drum 130 is driven such that a washing process (hereinafter, referred to as a "high-concentration washing process") can be carried out using the supplied highly-concentrated washing water (S520).

The above-mentioned high-concentration washing process is a process carried out to maximize the washing effect.

Specifically, in consideration of the fact that the washing performance is increased as the concentration of the detergent, which is one of principal factors affecting the washing performance, is increased, it is possible to accomplish excellent washing performance through the above-described high-concentration washing process.

At this time, the high-concentration washing process carried out by driving the drum 130 may be controlled such that the high-concentration washing process can be carried out simultaneously with the above-described washing water supply process.

Also, at this time, it is more preferable to control the circulating pump 160 such that the washing water in the tub 120 can be pumped by the circulating pump 160, and then can be circulated into the drum 130 through the circulation channel 170 (S530).

This is because, while the high-concentration washing process is carried out, the highly-concentrated washing water, can be injected to the laundry in the drum 130, and therefore, the uniform washing of all the laundry can be accomplished.

Of course, the control operation may be performed such that the washing water circulation process can be carried out simultaneously with the washing water supply process or such that the washing water supply process, the high-concentration washing process, and the washing water circulation process can be simultaneously carried out.

During the above-described high-concentration washing process, on the other hand, the steam supply unit may be controlled such that high-temperature steam can be injected into the drum 130, and therefore, the interior temperature of the drum 130 can be maintained at the optimum temperature level where the washing performance is maximally increased.

Specifically, the interior temperature of the drum is maintained at the optimum temperature level (approximately 40° C. to 60° C.), where the most efficient washing performance is accomplished through the activation of the detergent, by the high-temperature steam, and therefore, the washing efficiency is improved.

Of course, the control operation may be performed such that the steam supply process can be carried out simultaneously with the washing water supply process, such that the steam supply process can be carried out simultaneously with the washing water circulation process, or such that the steam supply process, the washing water supply process, and the washing water circulation process can be simultaneously carried out.

After the above-described high-concentration washing process has been carried out for a predetermined period of time, the steam supply unit is controlled such that the high-temperature steam can be injected into the drum 130 (S540).

The reason why the high-temperature steam is injected into the drum is to increase the interior temperature of the drum 130 to a sterilization temperature such that various bacilli contained in the laundry can be sterilized at the sterilization temperature.

Of course, the drum 130 is continuously driven even at this time, and therefore, the high-concentration sterilization washing process is continuously carried out (S550). This state is as shown in FIG. 8.

Especially, the above-described steam injection process may be controlled such that the steam injection process can be continuously carried out during the high-concentration sterilization washing process. In this case, however, the amount of steam supplied into the drum 130 may be excessively increased, or the interior temperature of the drum 130 may be excessively increased, whereby the power consumption is correspondingly increased.

For this reason, it is most preferable to control the steam injection process such that the steam injection process can be carried out only within a predetermined temperature range and only for a predetermined period of time.

Here, the predetermined temperature range is a temperature range at which the sterilization of bacilli is possible, and the predetermined period of time is a period of time in which the sterilization of bacilli is possible, and therefore, the most excellent sterilization effect can be obtained.

The control method of controlling the steam injection process, such that the steam injection process can be carried out only within the predetermined temperature range and only for the predetermined period of time, is performed by repeatedly operating the steam supply unit and interrupting the operation of the steam supply unit.

Specifically, the power supply for controlling the heating operation of the heating part 210 is selectively turned on and off, whereby the interior temperature of the drum 130 is maintained within the predetermined temperature range.

At this time, the confirmation of the temperature is carried out through the reading of a signal detected by the temperature sensor 150.

Consequently, the high-concentration washing process and the sterilization washing process are sequentially carried out through the above-described process.

After the high-concentration washing process and the sterilization washing process are completed, washing water is further supplied into the tub 120 (S560).

At this time, the washing water supplied into the tub 120 does not contain detergent. The washing mater is further supplied until the washing water reaches a predetermined water level ("a second water level") previously set depending upon the amount of the laundry. This state is as shown in FIG. 9.

The above-described process is a process for diluting the highly-concentrated detergent contained in the laundry to prevent the deterioration of the laundry due to prolonged exposure of the laundry to the highly-concentrated detergent and to rinse the highly-concentrated detergent out of the laundry.

Also, the drum 130 is controlled such that the drum 130 is continuously driven during the above-described process.

Consequently, a dilution washing process is carried out such that the highly-concentrated detergent can be smoothly removed from the laundry (S570).

Especially, in consideration of the fact that various contaminants separated from the laundry are contained in the highly-concentrated detergent, the contaminants are also smoothly removed from the laundry.

On the other hand, in consideration of that the temperature of the further supplied washing water is approximately 30° C. or less during the dilution washing process through the further supply of the washing water, the temperature of the entire washing water is decreased below the optimum washing temperature at which the optimum wa shing performance is accomplished, for example, 40° C. or less, through the mixing of the existing washing water and the further supplied washing water.

Consequently, it is most preferable to operate the washing water heater 122 in the tub 120, during the dilution washing process through the further supply of the washing water, such that the washing water in the tub 120 can be heated by the washing water heater 122, and therefore, the temperature of the entire washing water can be maintained at approximately 40° C. or more.

Of course, the control operation may be performed such that high-temperature steam is injected into the drum 130 without directly heating the washing water, and therefore, the interior temperature of the drum 130 reaches the optimum washing temperature at which the washing performance is improved.

Especially, it is more preferable to control the circulating pump 160 such that the washing water in the tub 120 can be pumped by the circulating pump 160, and then can be supplied into the drum 130 through the circulation channel 170 during the above-described process, i.e., the dilution washing process through the further supply of the washing water.

This is because the highly-concentrated detergent can be smoothly removed from the laundry, and therefore, the uniform washing of all the laundry can be accomplished.

After the above-described dilution washing process is carried out for the predetermined period of time, the washing operation of the laundry is completed, and the generation of heat from the washing water heater 122, the driving of the circulating pump 160, and the driving of the drum 130 are stopped.

After the above-described washing operation is completed, the washing water in the tub 120 is drained through the water drainage channel 121, and then at least one rinsing operation through supply of new washing water is carried out.

Of course, it is preferable to further include a process of rotating the drum 130 at high speed to remove water from the laundry after the washing water is drained and before the rinsing operation is carried out.

Now, a washing method of a washing machine according to another preferred embodiment of the present invention will be described in detail.

As shown in FIG. 6, when a washing process is requested by a user, a controller (not shown), which constitutes a part of the washing machine, controls the steam supply unit to supply high-temperature steam into the drum 130 (S610).

As a result, laundry in the drum 130 is wetted by the high-temperature steam, and furthermore, the interior temperature of the drum 130 reaches the optimum temperature level at which the washing performance is maximally accomplished.

Specifically, the interior temperature of the drum 130 reaches the optimum temperature level, at which the washing performance is maximally accomplished, by the high-temperature steam, and therefore, the washing efficiency is improved.

At this time, the temperature is 40° C. or more. Preferably, the temperature is between 40° C. and 80° C.

Also, it is more preferable to perform the control operation such that the drum 130 is driven while the steam is supplied into the drum as described above, whereby the laundry in the drum 130 can be uniformly wetted. This state is as shown in FIG. 8.

When the interior temperature of the drum 130 is maintained at the high temperature level through the above-described process, the controller performs a control operation such that washing water is supplied into the tub 120 (S620).

At this time, the washing water passes through the detergent box 114 mounted on the pipe line of the washing water supply pipe 113 in the course of the washing water being supplied through the washing water supply pipe 113. Since a predetermined amount of detergent is received in the detergent box 114, the washing water supplied into the tub 120 contains the detergent stored in the detergent box 114.

Especially, in the above-described washing water supply process, the washing water is controlled such that the washing water is in a highly concentrated state.

This is accomplished by maintaining the water level of the supplied washing water such that the water level of the supplied washing water is lower than a predetermined water level of washing water previously set depending upon the amount of laundry but is higher than the bottom surface of the drum 130, and, especially, the water level of the supplied washing water is a level at which the washing water heater 122 is approximately submerged in the washing water, as shown in FIG. 7.

At this time, it is most preferable that the water level of the supplied washing water is a level at which the bottom surface of the drum 130 is approximately submerged in the washing water, i.e., the level at which the laundry in the drum 130 is approximately wetted ("first water level").

After the above-described water supply process is completed, the drum 130 is driven such that a washing process (hereinafter, referred to as a "high-concentration washing process") can be carried out using the supplied highly-concentrated washing water (S630).

The above-mentioned high-concentration washing process is a process carried out to maximize the washing effect.

Specifically, in consideration of the fact that the washing performance is increased as the concentration of the detergent, which is one of principal factors affecting the washing performance, is increased, it is possible to accomplish excellent washing performance through the above-described high-concentration washing process.

At this time, the high-concentration washing process carried out by driving the drum 130 may be controlled such that the high-concentration washing process can be carried out simultaneously with the above-described washing water supply process.

Also, at this time, it is more preferable to control the circulating pump 160 such that the washing water in the tub 120 can be pumped by the circulating pump 160, and then can be circulated into the drum 130 through the circulation channel 170 (S640).

This is because, while the high-concentration washing process is carried out, the highly-concentrated washing water can be injected to the laundry in the drum 130, and therefore, the uniform washing of all the laundry can be accomplished.

Of course, the control operation may be performed such that the washing water circulation process can be carried out simultaneously with the washing water supply process or such that the washing water supply process, the high-concentration washing process, and the washing water circulation process can be simultaneously carried out.

Consequently, the high-concentration washing of the laundry in the drum 130 is performed, while the interior temperature of the drum is maintained at the high temperature level, through the above-described process, whereby the maximum washing performance is obtained.

After the above-described high-concentration washing process is completed for a predetermined period of time, the control operation is performed such that washing water is further supplied into the tub 120 (S650).

At this time, the washing water supplied into the tub 120 does not contain detergent. The washing water is further supplied until the washing water reaches a predetermined water level ("a second water level") previously set depending upon the amount of the laundry. This state is as shown in FIG. 9.

The above-described process is a process for diluting the highly-concentrated detergent contained in the laundry to prevent the deterioration of the laundry due to prolonged exposure of the laundry to the highly-concentrated detergent and to rinse the highly-concentrated detergent out of the laundry.

Also, the drum 130 is controlled such that the drum 130 is continuously driven during the above-described process.

Consequently, a dilution washing process is carried out such that the highly-concentrated detergent can be smoothly removed from the laundry (S660).

Especially, in consideration of the fact that various contaminants separated from the laundry are contained in the highly-concentrated detergent, the contaminants are also smoothly removed from the laundry.

On the other hand, in consideration of that the temperature of the further supplied washing water is approximately 30° C. or less during the dilution washing process through the further supply of the washing water, the temperature of the entire washing water is decreased below the optimum washing temperature at which the optimum washing performance is accomplished, for example, 40° C. or less, through the mixing of the existing washing water and the further supplied washing water.

Consequently, it is most preferable to operate the washing water heater 122 in the tub 120, during the dilution washing process through the further supply of the washing water, such that the washing water in the tub 120 can be heated by the washing water heater 122, and therefore, the temperature of the entire washing water can be maintained at approximately 40° C. or more.

Of course, the control operation may be performed such that high-temperature steam is injected into the drum 130 without directly heating the washing water, and therefore, the interior temperature of the drum 130 reaches the optimum washing temperature at which the washing performance is improved.

At this time, the control operation may be performed such that the washing water heating process can be carried out while the washing water is further supplied, after the further supply of the washing water is completed but before the dilution washing process is carried out, or while the dilution washing process is carried out.

Especially, it is more preferable to control the circulating pump 160 such that the washing water in the tub 120 can be pumped by the circulating pump 160, and then can be supplied into the drum 130 through the circulation channel 170 during the above-described process, i.e., the dilution washing process through the further supply of the washing water.

This is because the highly-concentrated detergent can be smoothly removed from the laundry, and therefore, the uniform washing of all the laundry can be accomplished.

After the above-described dilution washing process is carried out for the predetermined period of time, the washing operation of the laundry is completed, and the generation of heat from the washing water heater 122, the driving of the circulating pump 160, and the driving of the drum 130 are stopped.

After the above-described washing operation is completed, the washing water in the tub 120 is drained through the water drainage channel 121, and then at least one rinsing operation through supply of new washing water is carried out.

Of course, it is preferable to further include a process of rotating the drum 130 at high speed to remove water from the laundry after the washing water is drained and before the rinsing operation is carried out.

In this embodiment, it is preferable to appropriately drive the circulating pump together with the drum motor such that the washing effect can be greatly improved. To this end, it is preferable to perform the washing operation while driving the circulating pump under the same condition (the same real operation rate) as the drum motor during the steam injection process and driving the circulating pump at the pre-determined pattern irrespective of the drum motor after the steam injection process is completed.

Hereinafter, a description will be given of driving control of the driving motor and the circulating pump and water level detection in the washing method of the mashing machine according to the present invention.

Figure 10:
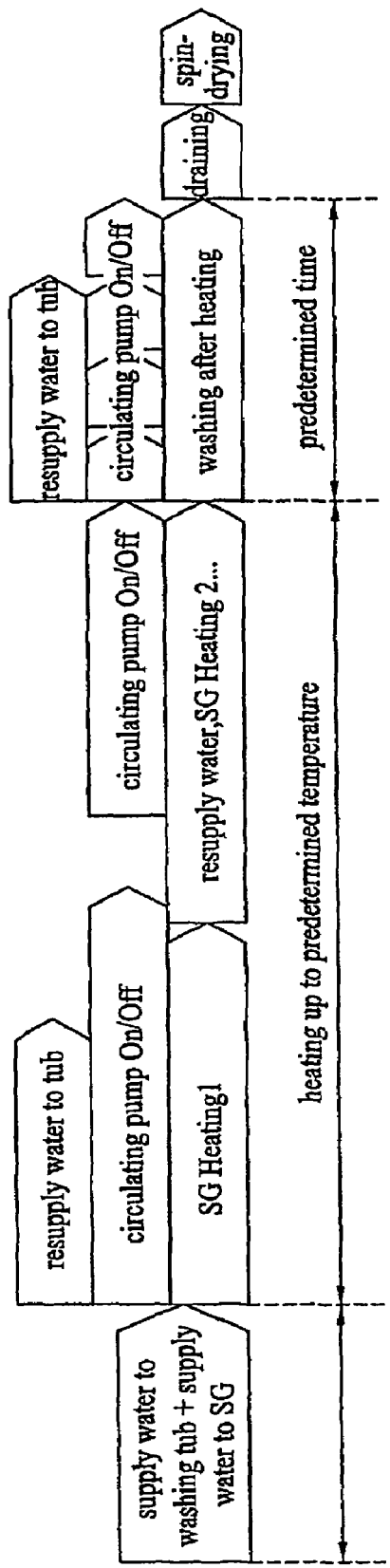
FIG. 10 is an operation diagram illustrating an example of all operations of the washing machine according to the present invention.
Figure 11:
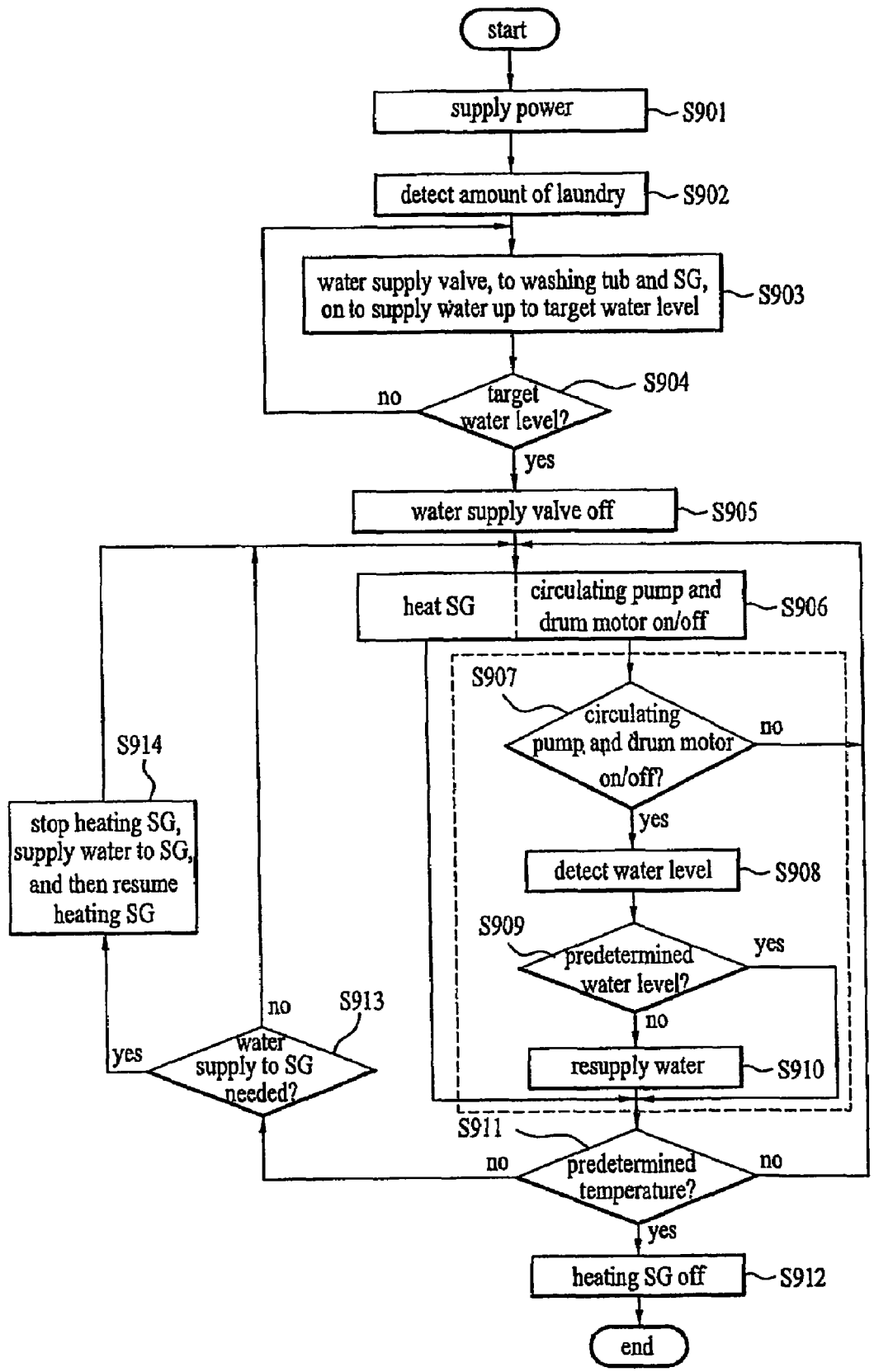
FIG. 11 is a flow chart illustrating water level detection and water resupply control of the washing machine according to the present invention.

FIG. 10 is an operation diagram illustrating an example of all operations of the washing machine according to the present invention, and FIG. 11 is a flow chart illustrating water level detection and water resupply control of the washing machine according to the present invention.

Figure 12:
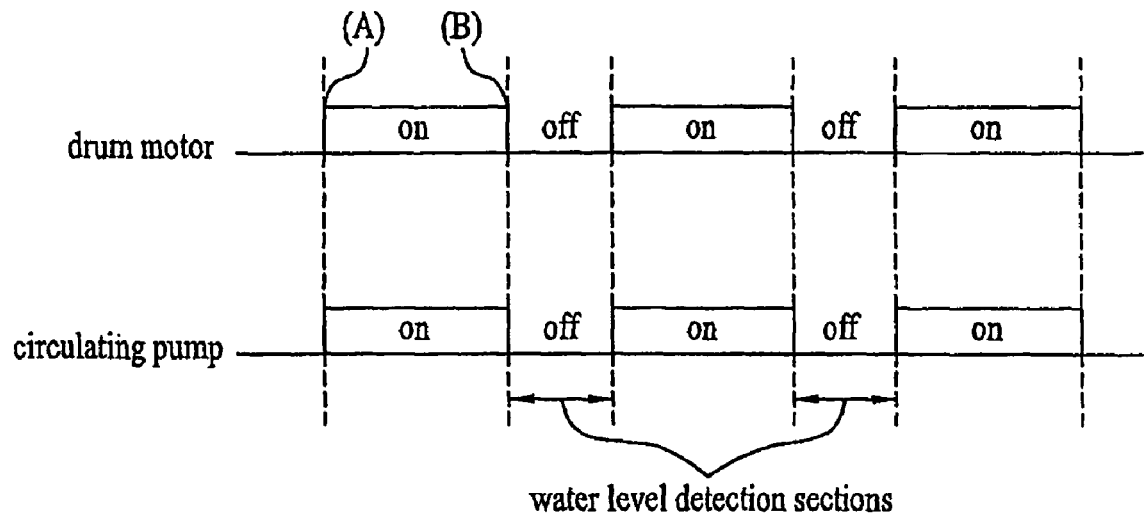
FIG. 12 is an operation timing diagram of a drum motor and a circulating pump when washing control is performed according to a preferred embodiment of the present invention.
Figure 13:
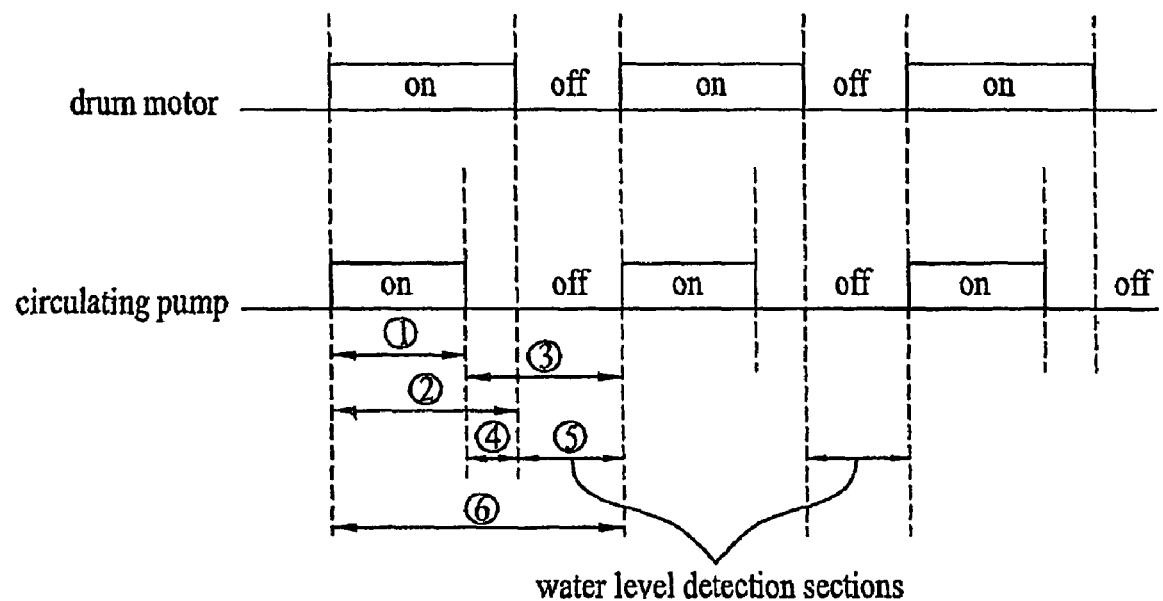
FIG. 13 is an operation timing diagram of a drum motor and a circulating pump when washing control is performed according to another preferred embodiment of the present invention.

FIG. 12 is an operation timing diagram of the drum motor and the circulating pump when washing control is performed according to a preferred embodiment of the present invention, and FIG. 13 is an operation timing diagram of the drum motor and the circulating pump when washing control is performed according to another preferred embodiment of the present invention.

According to the present invention, a stable water detection section is secured to increase accuracy of the water level detection for further water supply during the steam supply process and the washing process.

To this end, a control operation is performed such that at the step where the on/off driving of the motor for the drum rotation and the on/off driving of the circulating pump for the washing water circulation are repeated, the off timing of the circulating pump coincides with the off timing of the drum motor, or the circulating pump is turned off earlier than the drum motor.

As shown in FIG. 10, water is supplied first to the tub and the steam supply unit. After the water is supplied up to a predetermined water level, the water supply is stopped.

While the heating operation is performed to generate steam, the circulating pump is driven to uniformly apply the detergent to the laundry and save the washing water. Based on the result of the water level detection, water is supplied again into the tub.

After the heating operation is carried out such that the temperature reaches a pre-determined temperature level, the washing operation is carried out for a predetermined period of time.

During the washing operation, the resupply of water into the tub and the on/off driving of the circulating pump based on the water level detection are repeatedly carried out.

After the washing operation is carried out for the predetermined period of time, a water draining operation, a spin-drying operation, and a rinsing operation are carried out.

The present invention provides a more accurate steam washing control method for reducing the washing water consumption, reducing the power consumption, and improving the washing effect in the above-described washing operation.

Specifically, as shown in FIG. 11, the power is supplied (S901), the amount of laundry is detected (S902), and the water supply valve is turned on to supply washing water to the tub and the steam supply unit (SG) (S903).

Here, the reference water level set to supply the washing water may be different depending upon the amount of the laundry, which is classified based on the laundry amount detection valve. However, the reference water level may be equally set, such that the reference water level is the minimum water level irrespective of the laundry amount, in order to save the washing water.

The reference water level is set such that the water level value which is referenced when the water is initially supplied is equal to the water level value-which is referenced when the water is further supplied. Alternatively; the reference water level may be set such that the water level value which is referenced when the water is initially supplied is different from the water level value which is referenced when the water is further supplied.

When it is necessary to differently set the water level values, it is preferable to set the water level values such that the water level when the water is further supplied is less than the water level when the water is initially supplied, whereby the saving effect of the washing water is increased.

And the present invention is applied not only to an algorithm at which the water levels are set differently based on the detected amount of the laundry but also an algorithm at which the water levels are set equally irrespective of the amount of the laundry.

When it is determined that the water level reaches the target water level as the result of the water level detection (S904), the water supply valve is turned off to interrupt the water supply (S905).

Subsequently, the heating operation to generate steam is carried out until the temperature reaches the predetermined temperature level, and the generated steam is supplied such that the interior of the drum is maintained in the high-temperature state.

At the same time, the circulating pump and the drum motor are driven on/off such that the laundry can be uniformly wetted and the detergent can be uniformly applied to the laundry (S906).

The washing effect is improved by maintaining the interior of the drum at the temperature where the most efficient washing performance can be accomplished due to the activation of the detergent using the high-temperature steam. At this time, the temperature is 40° C. or more. Preferably, the temperature is between 40° C. and 80° C.

In this way, it is determined whether further water supply is needed by detecting the water level in the steam generation unit (SG) and the tub while the heating operation is carried out, and the circulating pump and the drum motor are driven on/off, which may be accomplished according to the following embodiments of the present invention.

First, as shown in FIG. 12, the driving time of the drum motor for driving the washing drum and the driving time of the circulating pump are controlled.

Specifically, during the steam washing operation at which the water supply to the steam supply unit, the operation of the circulating pump, the water supply into the washing tub, and the heating operation for generating steam are repeatedly carried out according to the predetermined conditions, the control operation is carried out such that the water level detection is possible within a more stable section, and the above-mentioned operations can be efficiently controlled.

First, a control operation is carried out such that the on timing of the drum motor coincides with the on tiring of the circulating pump (A).

Secondly, a control operation is carried out such that the off timing of the drum motor coincides with the off timing of the circulating pump (B), and the water level detection is carried out at the off sections of the drum motor and the circulating pump.

Subsequently, as shown in FIG. 13, the driving time of the drum motor for driving the washing drum and the driving time of the circulating pump are controlled.

First, a control operation is carried out such that the on timing of the drum motor coincides with the on timing of the circulating pump.

Secondly, a control operation is carried out such that the on section ②+the off section ⑤ of the drum motor coincide with the on section ①+the off section ③ of the circulating pump, and the water level detection is carried out at the off sections of the drum motor and the circulating pump. Preferably, the control operation is carried out such that the water level detection is carried out at the off section ⑤, at which both the drum motor and the circulating pump are off.

Here, a control operation is carried out such that the on section ① of the circulating pump is shorter by the section ④ than the on section ② of the drum motor in order to sufficiently secure a section for stable water level detection. Preferably, the control operation is carried out such that the ratio in size of the on section ② of the drum motor to the on section ① of the circulating pump is 10:8, whereby the accuracy of the water level detection is increased.

The change in the amount of water at the water level detection region is more stable by carrying out the control operation such that the on section ① of the circulating pump is shorter by the section ④ as described above.

In this way, the water level detection according to the present invention is performed at the sections where the water level of the washing water is not changed, i.e., at the off sections of the drum motor and the circulating pump. In this case, the washing water is maximally gathered in the tub.

The change in water level of the washing water is large at the sections where the drum is rotated and the circulating pump is driven, and therefore, the stable water level detection is difficult with the result that unnecessary water resupply may be carried out. According to the present invention, the occurrence of this problem is prevented, and therefore, the amount of the washing water consumed is reduced.

And it is preferable that the water level detection be carried out at the latter halves of the entire off sections at which the drum motor and the circulating pump are off. This is to secure spare time sufficient to stabilize the change of the water level.

Specifically, the driving of the circulating pump and the drum motor and the water level detection are performed as follows at the sections where the circulating pump and the drum motor are driven on/off.

First, it is determined whether the operations of the circulating pump and the drum motor are off while the heating operation is carried out by the steam generation unit (SG) (S907).

When it is determined that the operations of the circulating pump and the drum motor are off, the water level in the tub is detected (S908); otherwise the washing water is circulated by the operation of the circulating pump, and the drum is rotated.

And it is determined whether further water supply is needed by comparing the water level detection result with the predetermined water level (S909).

When it is determined that the further water supply is needed, the further water supply is carried out (S910); otherwise it is determined whether the current temperature inside the drum has increased to the predetermined temperature level without carrying out the further water supply (S911).

When it is determined that the current temperature inside the drum has not increased to the predetermined temperature level, the water level at the off section is detected while the circulating pump and the drum motor are driven based on the predetermined reference, which is repeatedly carried out.

When it is determined that the current temperature inside the drum has not increased to the predetermined temperature level, the heating operation for supplying steam is continuously carried out, and the water level in the steam supply unit is detected to determine whether water supply to the steam supply unit is needed (S913).

When it is determined that the water supply to the steam supply unit is needed, the heating operation is interrupted, the water supply is carried out, and then the heating operation is resumed (S914). When it is determined that the water supply to the steam supply unit is not needed, on the other hand, the heating operation is continuously carried out until the interior temperature of the drum reaches the predetermined temperature level.

When the interior temperature of the drum reaches the predetermined temperature level, the heater of the steam supply unit is turned off, and then subsequent operations are carried out (S912).

The subsequent operations include a further washing operation in which the drum is rotated and the circulating pump is driven on/off without supply of the steam, a rising operation, and a spin-drying operation.

The embodiment of the present invention, in which the water level is stably detected at the off sections of the circulating pump and the drum motor, is applied only to the SG heating step as shown in FIG. 10; however, the above-mentioned embodiment is also applied to detect the water level at the washing process carried out for the predetermined period of time after the steam supply by the heating is completed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a washing machine, and more particularly, a novel washing method of a washing machine that is capable of performing a washing operation of laundry with reduced washing water consumption and low power consumption and, in addition, sterilizing the laundry.

The invention claimed is:

1. A controlling method of a washing machine including a steam supply unit to evaporate water and supply steam into a drum and a washing heater mounted to a tub to heat washing water in the tub, the controlling method comprising:
supplying washing water with detergent into the tub, wherein the supplied washing water is lower than a predetermined water level;
performing a high concentration washing process by rotating a drum;
supplying steam into the drum to increase an inner temperature of the drum by operating a heating part of the steam supply unit and without directly heating the washing water;
supplying washing water without detergent until the washing water reaches the predetermined water level after the high concentration washing process and the supplying steam;
performing a dilution washing process by rotating the drum;
operating the washing heater when the washing water reaches the predetermined water level to increase a temperature of the washing water without operating the heating part of the steam supply unit and directly heating the wash water; and
rinsing the laundry after the dilution washing process; and spin-drying the laundry.

2. The controlling method of claim 1, wherein the supplying of washing water to perform the high concentration washing process includes supplying washing water through a detergent box into the tub until a water level of the tub reaches around a bottom surface of the drum or at which a heater in the tub submerges.

3. The controlling method of claim 1, wherein the supplying of steam includes supplying steam until a temperature inside the tub reaches a predetermined temperature.

4. The controlling method of claim 3, wherein the supplying of steam includes supplying steam after the high concentration washing process until the temperature reaches a predetermined temperature appropriate to sterilize the laundry.

5. The controlling method of claim 4, wherein the predetermined temperature is between 40° C. and 80° C.

6. The controlling method of claim 3, wherein the supplying of steam includes supplying steam during the high concentration washing process until the temperature reaches a predetermined temperature appropriate for enhancing an activation of detergent.

7. The controlling method of claim 4, wherein the predetermined temperature is between 40° C. and 60° C.

8. The controlling method of claim 1, wherein the supplying of steam includes supplying steam for a predetermined period of time.

9. The controlling method of claim 1, wherein the supplying of steam includes repeatedly supplying steam with time intervals.

10. The controlling method of claim 1, further comprises circulating the washing water in the tub by using a circulation pump and re-supplying washing water into the tub.

11. The controlling method of claim 1, wherein the supplying washing water into the tub to perform a dilution washing process is performed when the washing water of high detergent concentration remains.

12. The controlling method of claim 11, wherein the predetermined level is predetermined based on an amount of laundry.

13. The controlling method of claim 1, wherein the operating of the washing heater includes operating the washing heater until a temperature inside the tub reaches 40° C. or higher.

14. The controlling method of claim 1, further includes sensing a water level of the tub while a motor to rotate the drum is turned off.

15. The controlling method of claim 10, further includes sensing a water level of the tub while a motor to rotate the drum and the circulating pump are turned off.

16. The controlling method of claim 1, further comprising:
wetting the laundry and circulating the washing water supplied into the tub to the drum, which are carried out simultaneously, while the high-concentration washing process is carried out.

17. The washing method according to claim 1, further comprising:
wetting the laundry, circulating the washing water supplied into the tub to the drum, and supplying steam into the drum, all of which are carried out simultaneously, while the high-concentration washing process is carried out.

18. The washing method according to claim 1, wherein the steam supplying is controlled, thereby the interior temperature of the drum being maintained at an optimum temperature level.

* * * * *